(12) United States Patent
Jeon et al.

(10) Patent No.: US 9,063,329 B2
(45) Date of Patent: Jun. 23, 2015

(54) HEAD UP DISPLAY DEVICE AND METHOD FOR VEHICLE

(71) Applicant: Hyundai Motor Company, Seoul (KR)

(72) Inventors: Jung H. Jeon, Gyeonggi-do (KR); Byung K. Kim, Daegu (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/097,545

(22) Filed: Dec. 5, 2013

(65) Prior Publication Data
US 2015/0070771 A1 Mar. 12, 2015

(30) Foreign Application Priority Data
Sep. 6, 2013 (KR) .................. 10-2013-0107354

(51) Int. Cl.
*G02B 27/14* (2006.01)
*G02B 27/01* (2006.01)

(52) U.S. Cl.
CPC .... *G02B 27/0149* (2013.01); *G02B 2027/0154* (2013.01)

(58) Field of Classification Search
CPC ..................................................... G02B 27/017
USPC .......................................................... 359/630
See application file for complete search history.

(56) References Cited

U.S. PATENT DOCUMENTS

2005/0024490 A1* 2/2005 Harada et al. ................. 348/115

FOREIGN PATENT DOCUMENTS

| KR | 10-0673833 | 1/2007 |
| KR | 10-2008-0045849 | 5/2008 |
| KR | 10-2010-0026466 | 3/2010 |

* cited by examiner

*Primary Examiner* — James Jones
(74) *Attorney, Agent, or Firm* — Mintz Levin Cohn Ferris Glovsky and Popeo, P.C.; Peter F. Corless (57) ABSTRACT

A head up display device for a vehicle includes: a housing mounted on a dashboard of the vehicle; a display unit that generates an image or a video; a combiner vertically elevated from the housing; a first cover operated together with the combiner to be opened and closed; a second cover operated together with the combiner to be opened and closed; and a mirror that rotates together with the first cover to be opened at the time of opening the first cover to reflect the video provided from the display unit to the combiner.

13 Claims, 8 Drawing Sheets

Fig.1

RELATED ART

Fig.2A

RELATED ART

Fig.2B

RELATED ART

HEAD UP DISPLAY DEVICE AND METHOD FOR VEHICLE

CROSS-REFERENCE TO RELATED APPLICATION

This application is based on and claims under 35 U.S.C. §119(a) priority from Korean Patent Application No. 10-2013-0107354, filed on Sep. 6, 2013 in the Korean intellectual Property Office, the disclosure of which is incorporated herein in its entirety by reference.

BACKGROUND (a) Field of the Invention

The present invention relates to a head up display device, and more particularly, to a head up display device for a vehicle capable of improving use convenience by automating the head up display device that provides a video to a windshield glass of the vehicle by use of a combiner.

(b) Description of the Related Art

Generally, a head up display is a system which displays various types of vehicle information on a windshield glass of a vehicle as virtual images to allow a driver to confirm the vehicle information while continuously keeping his/her eyes forward while driving the vehicle.

Figure 1:
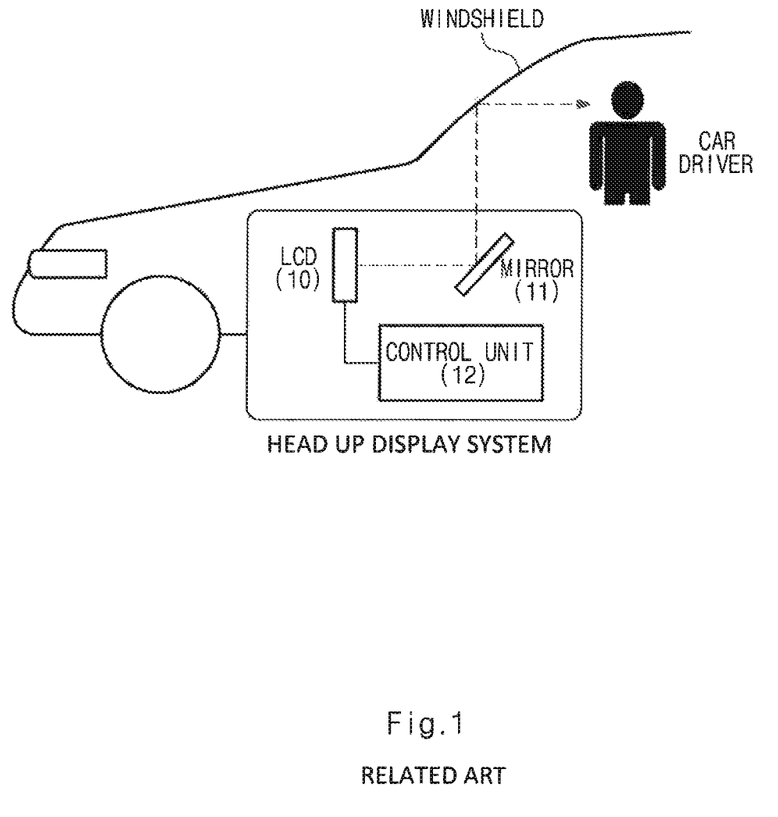
FIGS. 1 and 2A-2B are diagrams illustrating a head up display device for a vehicle according to the related art.

As illustrated in FIG. 1, a head up display device for a vehicle according to the related art is configured to include an LCD module 10, a mirror 11, and a control unit 12.

In particular, video images displayed by the LCD module 10, for example, video images corresponding to various types of vehicle information which is received from an electronic control unit (ECU) in a vehicle, are reflected from the mirror 11 and then projected to the windshield glass in front of a driver's seat.

As a result, the driver of the vehicle may confirm the video images of the virtual images projected to the windshield glass while continuously keeping his/her eyes forward during the driving of the vehicle.

Figure 2A:
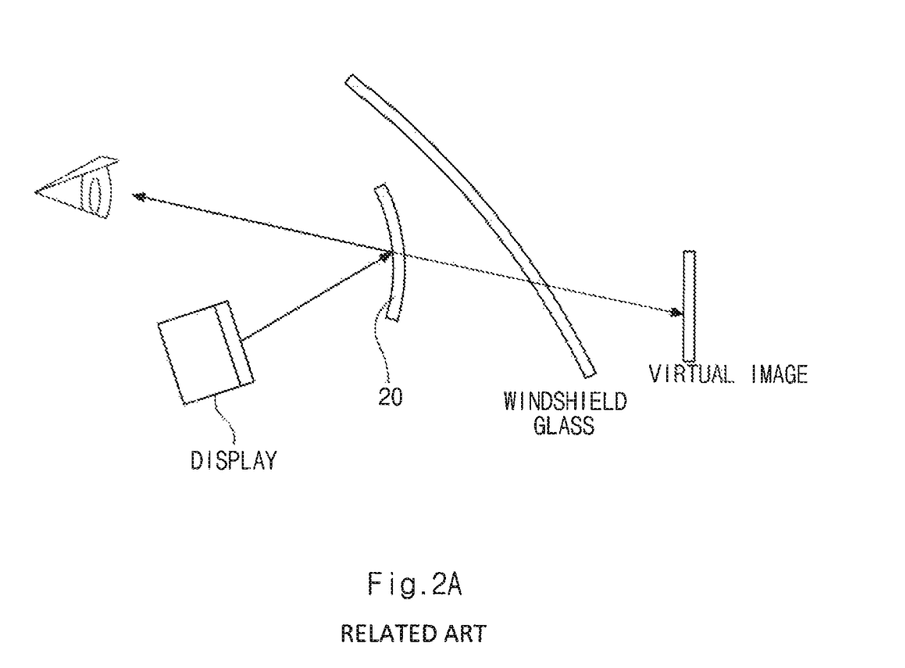
Figure 2B:
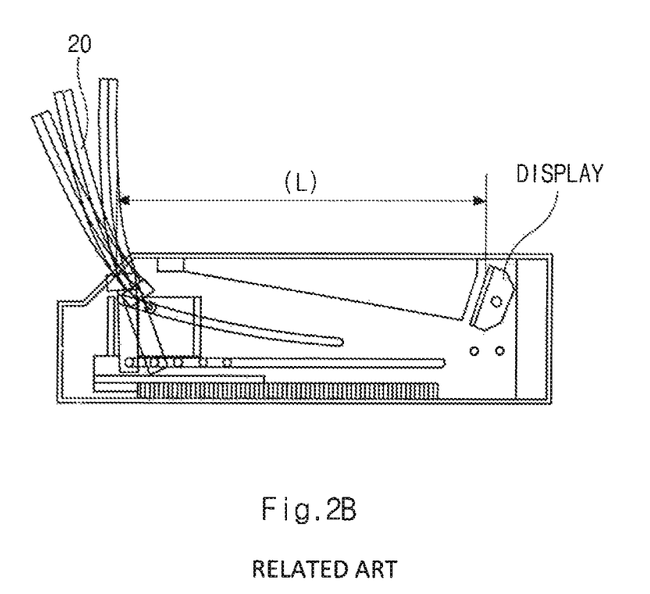

Further, as illustrated in FIGS. 2A-2B, the head up display device for a vehicle according to the related art includes a combiner 20, which is an aspherical lens. In this case, since a display is directly input to the combiner 20 from the LCD module 10, a distance L required for virtual image optical magnification becomes short, and thus the operation of the combiner is manually opened and closed, such that convenience of use may be degraded.

SUMMARY

One object to be achieved by the present invention is to improve convenience of use by automating a head up display device that provides a video to a windshield glass of a vehicle by use of a combiner.

In one aspect of the present invention, there is provided a head up display device for a vehicle, including: a housing configured to be mounted on a dashboard of the vehicle; a display unit configured to be mounted in the housing to generate an image or a video; a combiner configured to be vertically elevated from the housing; a first cover configured to rotate by being operated together with the combiner to be opened and closed; a second cover configured to rotate by being operated together with the combiner to be opened and closed; and a mirror configured to rotate by being operated together with the first cover to be opened and closed and be opened together at the time of opening the first cover to reflect the video provided from the display unit to the combiner.

The housing may be provided with a guide unit which is vertically provided with guide grooves, and a lower portion of the combiner may be provided with guide protrusions which protrude to both ends thereof to allow the guide protrusions of the combiner to be movably inserted into the guide grooves of the guide unit.

One end of the guide unit may be provided with a step motor, and the step motor may be operated together with a plurality of reduction gears which are operated together with the guide protrusions of the combiner through a bar-shaped lead screw to vertically elevate the combiner depending on the operation of the step motor.

The guide unit may be provided with a first connection gear and a second connection gear, and the first connection gear may be operated together with the first cover, and the second connection gear may be operated together with the second cover.

A rotating shaft of the mirror may be operated together with a rack gear, and a rotating shaft of the first cover may be provided with a first cover gear to allow the rack gear and the first cover gear to be operated together.

The guide unit provided with the first connection gear may be provided with a bracket provided with a sliding groove, and a side of the rack gear may be provided with a locking protrusion to allow the locking protrusion to move along the sliding groove.

A rotating shaft of the second cover may be provided with a second cover gear and may be operated together with the second connection gear of the guide unit.

A linkage may be thither provided between the mirror and the rack gear.

A side of the housing may be provided with a guide hole, and an end of the guide protrusion of the combiner may be inserted into the guide hole.

Further, the first cover may be configured to open in a forward direction, and the second cover may be configured to open in a backward direction.

A method for operating a head up display device for a vehicle can include steps of mounting a housing on a dashboard of the vehicle; mounting a display unit in the housing, the display unit configured to generate an image or a video; arranging a combiner so as to be elevated vertically from the housing; opening a first cover by rotating the first cover together with the combiner; opening a second cover by rotating the second cover together with the combiner; and rotating a mirror together with the first cover so as to be opened together with the first cover to reflect the video provided from the display unit to the combiner.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Exemplary embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As illustrated in FIGS. 3 to 8, a head up display device for a vehicle according to an exemplary embodiment of the present invention includes a housing 100 mounted with a display unit (not illustrated) which generates a video, a combiner 200 which is included in the housing 100 and arranged to be elevated, a first cover 300 and a second cover 400 which may be opened and closed while being operated together with the combiner 200, and a mirror 500 which is rotatably provided with being operated together with the first cover 300.

Figure 3A:
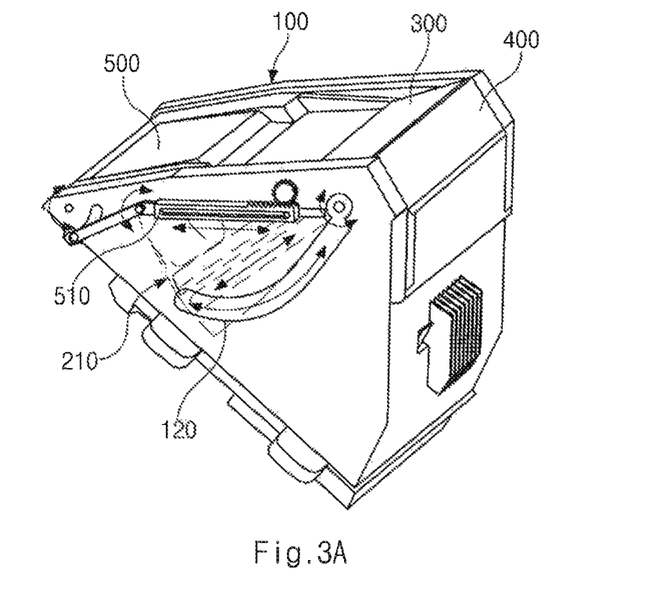
FIGS. 3A-3B are diagrams illustrating a head up display device for a vehicle according to an exemplary embodiment of the present invention.
Figure 3B:
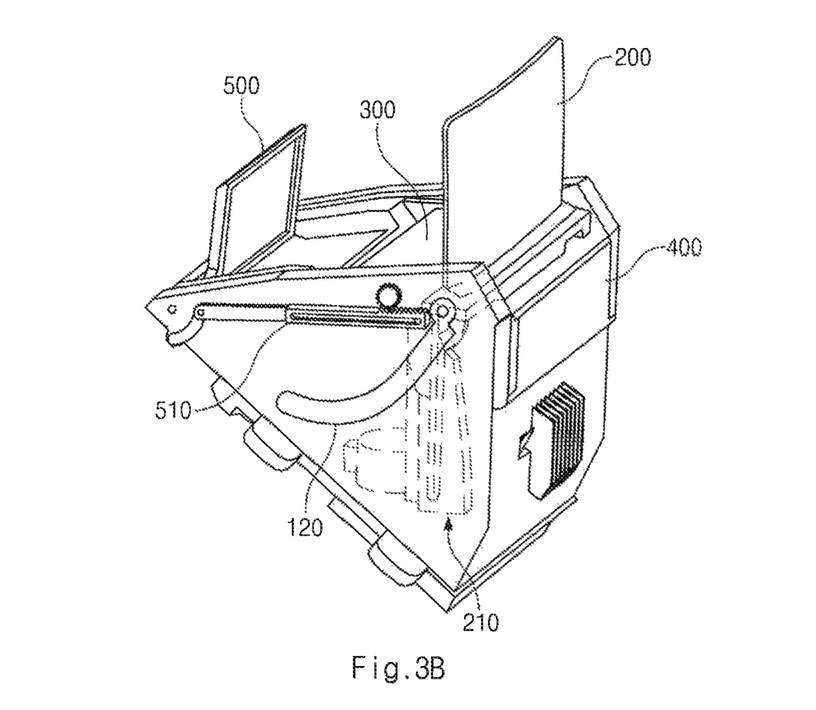

As illustrated in FIGS. 3A-3B, the housing 100 is inserted into a dashboard (not illustrated) of a vehicle and has a space firmed therein to elevate the combiner 200 (to be described below), and has a plurality of openings formed on an upper surface thereof to open and close the first cover 300, the second cover 400, and the mirror 500.

The display unit (not illustrated) is mounted in the housing 100 to generate an image or a video. However, the display unit may be disposed at a side or a lower portion of the housing 100 to allow the combiner 200 to be elevated without interference, In this configuration, the display unit is connected to an electronic control unit (ECU) performing an overall electronic control function in the vehicle to receive various types of information associated with the vehicle, such as a driving speed and an engine state of a vehicle, thereby generating an image or a video. Further, when the display unit is connected to an apparatus, such as a navigation terminal, the display unit receives various types of location information associated with a moving path to a specific destination, and the like to generate an image or a video.

The combiner 200 is arranged so as to be vertically elevated from the housing 100, and thus moves down to be disposed in the housing 100 when the head up display is not used and moves up to protrude above the housing 100 when the head up display is used, such that the image or the video generated from the display unit may be reflected from the mirror 500 (to be described below), and then may be irradiated to the combiner 200, thereby enabling a user to confirm vehicle information without a separate display device, such as navigation.

In this case, the combiner 200 is provided with an aspherical lens to improve focus accuracy of a subject and clearly display an irradiated vehicle information image or video, such that the image or the video is focused on the combiner 200 and can be seen to a driver's eye as a virtual image at a predetermined distance ahead.

Figure 4A:
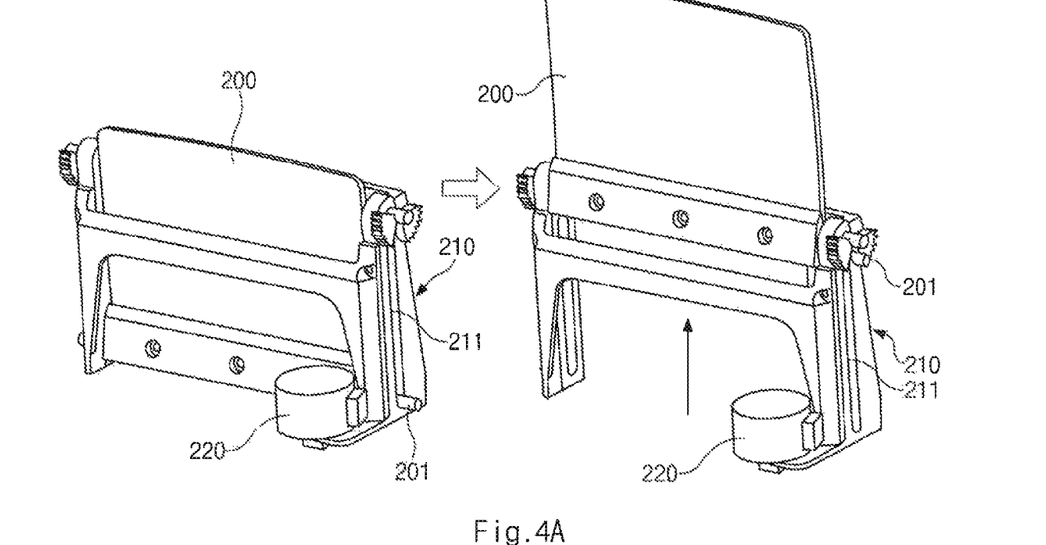
FIG. 4A is a diagram illustrating a combiner and a guide unit of the head up display device for a vehicle according to the exemplary embodiment of the present invention.

Meanwhile, as illustrated in FIG. 4A, an inside of the housing 100 is provided with a guide unit 210, which is vertically provided with guide grooves 211, and a lower portion of the combiner 200 is provided with guide protrusions 201, which protrude to both ends thereof, such that the guide protrusions 201 of the combiner 200 are movably inserted into the guide grooves 211 of the guide unit 210.

Figure 4B:
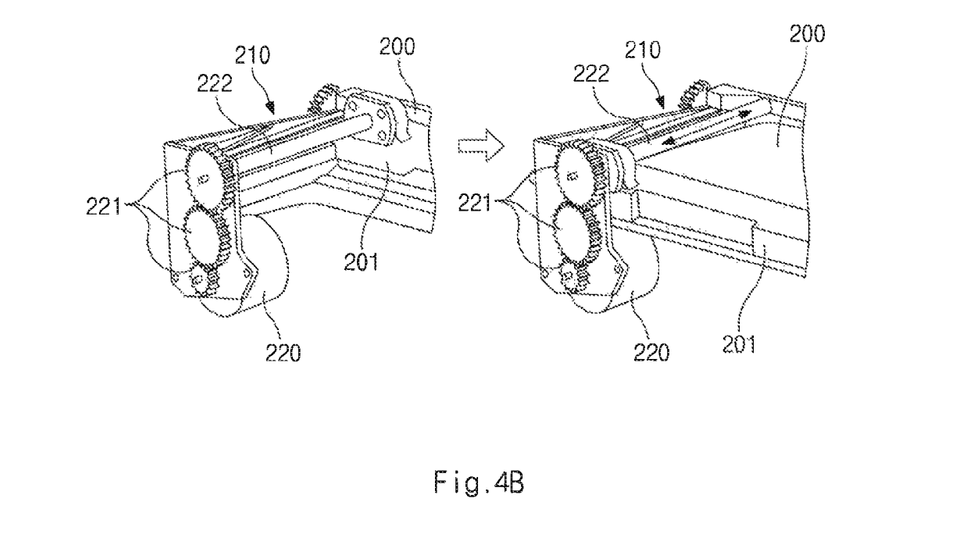
FIG. 4B is a diagram illustrating the guide unit of the head up display device for a vehicle according to the exemplary embodiment of the present invention.

Further, as illustrated in FIG. 4B, one end of the guide unit 210 is provided with a step motor 220, in which the step motor 220 is operated together with a plurality of reduction gears 221, which are operated together with the guide protrusions 210 of the combiner 200 through a bar-shaped lead screw to vertically elevate the combiner 200 depending on the operation of the step motor 220.

Figure 5:
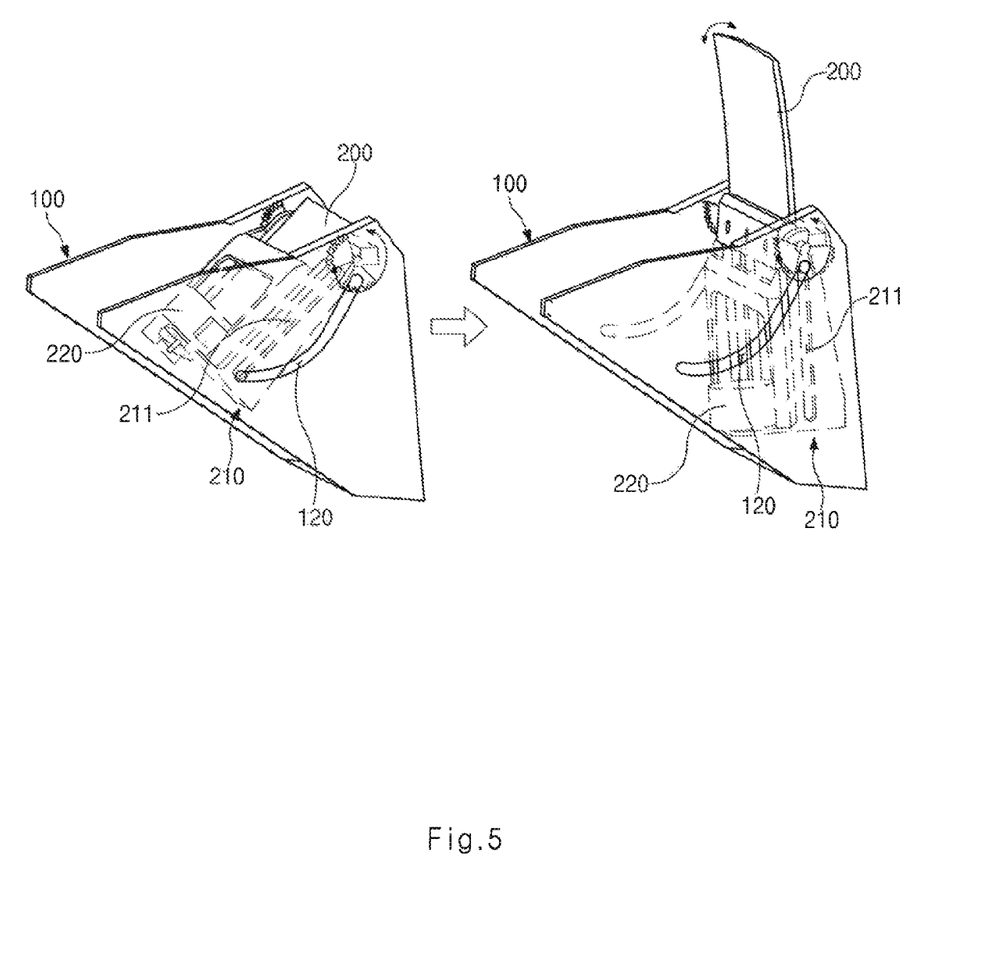
FIG. 5 is a diagram illustrating an operation state of the guide unit mounted with a combiner, in the head up display device for a vehicle according to the exemplary embodiment of the present invention.

Further, as illustrated in FIG. 5, a side of the housing 100 is provided lengthwise with a curved guide hole 120, and an end of the guide protrusion 201 of the combiner 200 inserted into the guide groove 211 is inserted into the guide hole 120 to move in a curved direction along the guide hole 120 when the combiner 200 is elevated, and thus the guide unit 210 mounted with the combiner 200 rotates, such that the combiner 200 may protrude above the housing 100 and an angle thereof may be finely controlled forward and backward.

The first cover 300 rotates by being operated together with the combiner 200 to be opened and closed, and thus is opened forward of the housing 100.

The second cover 400 rotates by being operated together with the combiner 200 to be opened and closed, and thus is opened backward of the housing 100.

In this case, the first cover 300 and the second cover 400 cover the combiner 200, and when the combiner 200 moves up, the first cover 300 rotates to be disposed on the upper surface of the housing 100, and the second cover 400 rotates to be received in the housing 100.

As illustrated in FIGS. 3A-3B and 8A-8B, the mirror 500, which is a plane mirror, rotates by being operated together with the first cover 300 to be opened and closed, so as to be disposed in front of the housing 100 to be opened together at the time of opening the first cover 300, thereby reflecting the image or the video provided from the display unit to the combiner 200.

Meanwhile, as illustrated in FIGS. 6A-6B and 7A-7B, the guide unit 210 included in the housing 100 is provided with a first connection gear 231 and a second connection gear 232, in which the first connection gear 231 is operated together with the first cover 300, and the second connection gear 232 is operated together with the second cover 400.

Figure 6A:
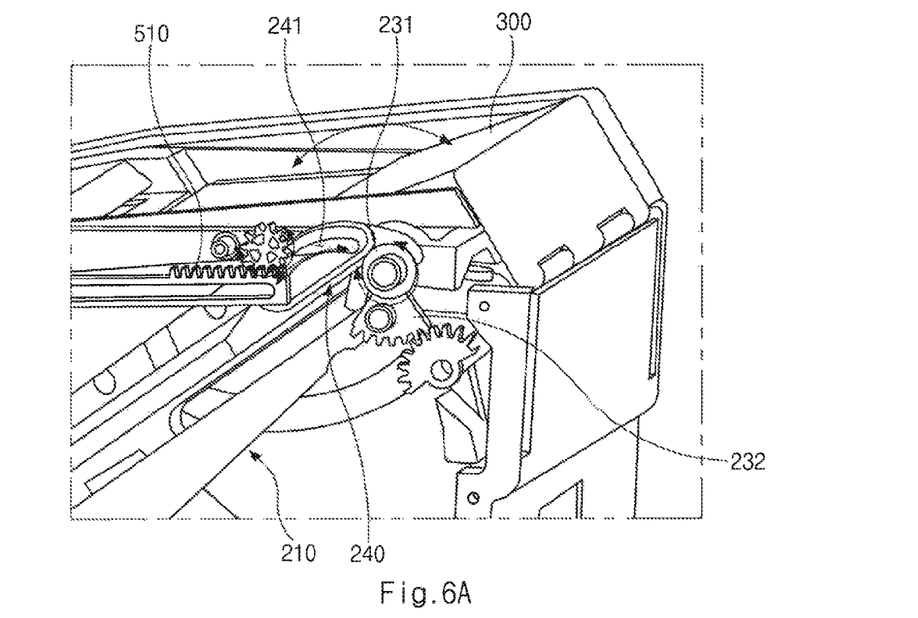
FIGS. 6A-6B are diagrams illustrating an operation state of a first cover, in the head up display device for a vehicle according to the exemplary embodiment of the present invention.
Figure 6B:
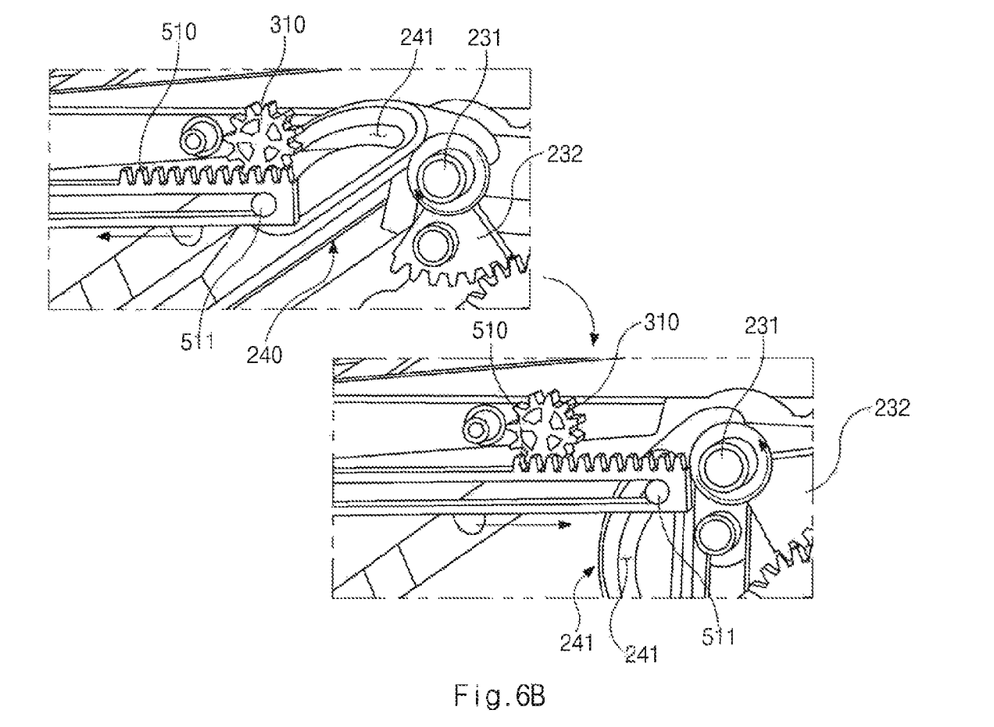

In this case, a rotating shaft of the mirror 500 is operated together with a rack gear 510, and a rotating shaft of the first cover 300 is provided with a first cover gear 310, such that the rack gear 510 at the mirror 500 side and the first cover gear 310 at the first cover 300 side may be operated together.

Further, the guide unit 210 provided with the first connection gear 231 is provided with a bracket 240 provided with a sliding groove 241, and a side of the rack gear 510 is provided with a locking protrusion 511, such that the locking protrusion 511 of the rack gear 510 may move along the sliding groove 241 of the bracket 240.

In particular, when the combiner 200 moves along the guide hole 120, the rack gear 510 also moves along the sliding groove 241 of the bracket 240, and when the rack gear 510 moves, the first cover 300 connected to the rack gear 510 through the first cover gear 310 is opened and closed while rotating.

Figure 7A:
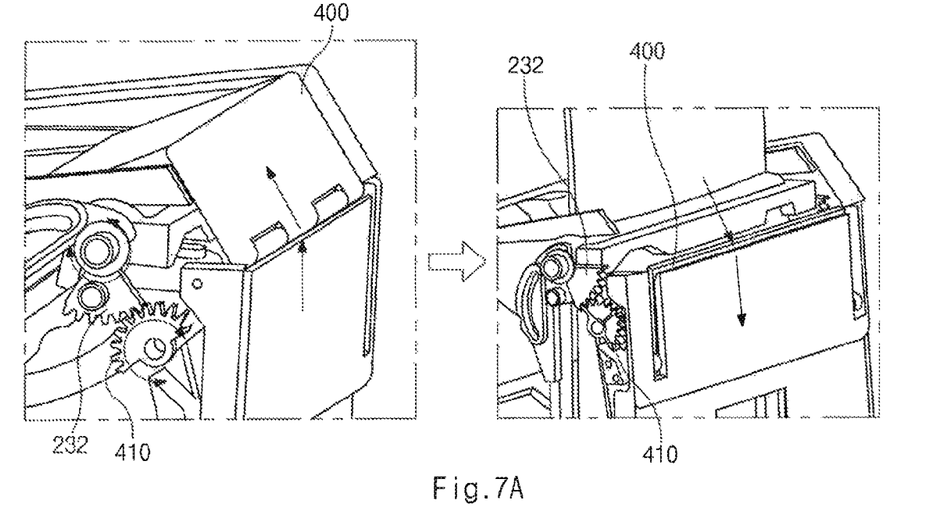
FIGS. 7A-7B are diagrams illustrating an operation state of a second cover, in the head up display device for a vehicle according to the exemplary embodiment of the present invention.
Figure 7B:
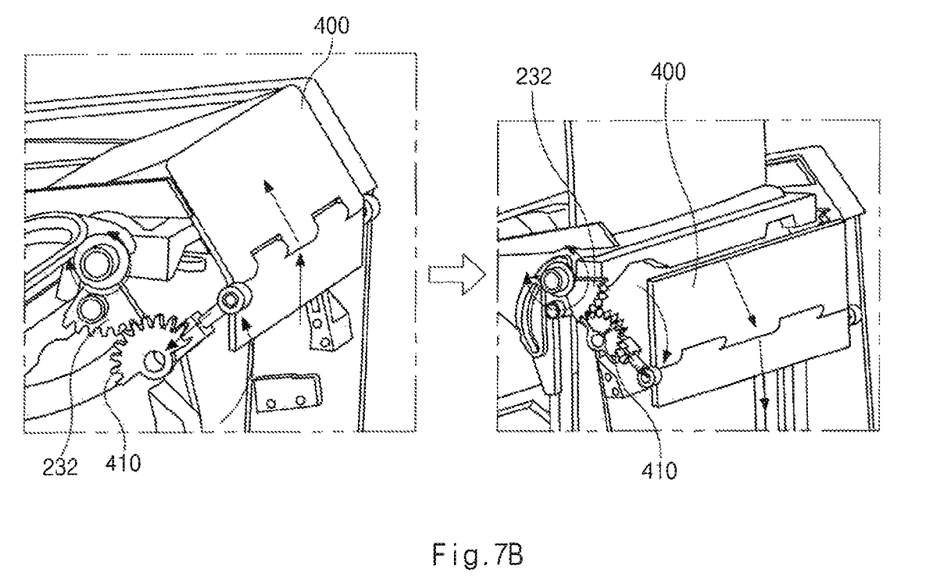

Meanwhile, a rotating shaft of the second cover 400 is provided with a second cover gear 410 to be operated together with the second connection gear 232 of the guide unit 210.

In particular, when the combiner 200 moves along the guide hole 120, the second cover 400 is also opened and closed while rotating by the rotation of the second cover gear 410, which is operated together with the second connection gear 232 of the guide unit 210.

Figure 8A:
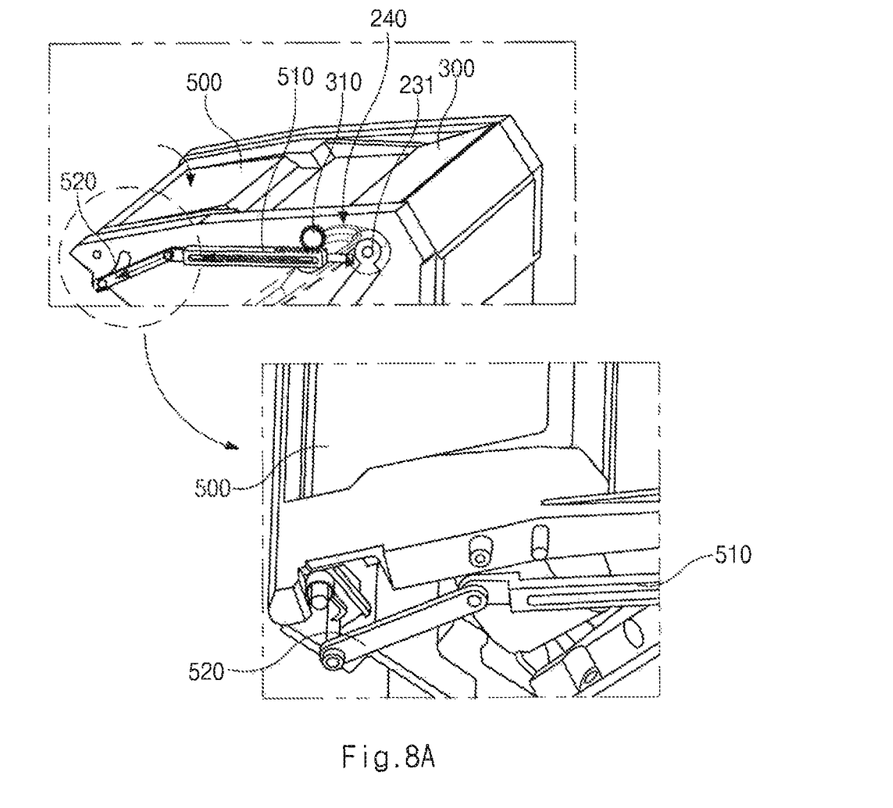
FIGS. 8A-8B are diagrams illustrating an operation state of a mirror, in the head up display device for a vehicle according to the exemplary embodiment of the present invention.
Figure 8B:
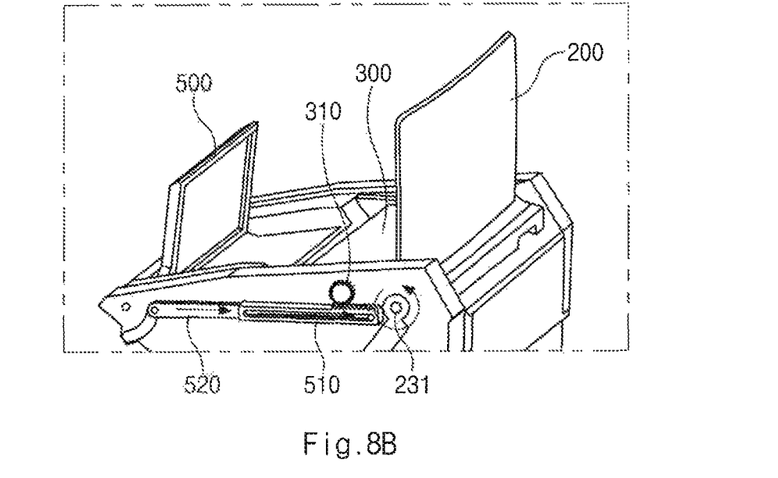

Meanwhile, as illustrated in FIGS. 8A-8B, when the rack gear 510 provided on the rotating shaft of the mirror 500 is operated together with the first cover gear 310 at the first cover 300 side to allow the combiner 200 to move along the guide hole 120 as described above, the first cover 300 rotates and thus the first cover gear 310 of the first cover 300 rotates, such that the rack gear 510 operated together with the first cover gear 310 linearly moves, and thus the mirror 500 is opened and closed while rotating.

In this case, a linkage 520 is further provided between the mirror 500 and the rack gear 510 to convert the linear motion of the rack gear 510 into a rotating motion, thereby rotating the mirror 500.

As described above, according to the exemplary embodiment of the present invention, the combiner 200 is vertically elevated by operating the step motor 220 to make the first cover 300 and the second cover 400 open and close. Further, when the combiner 200 moves up, the mirror 500 is also opened up to project the vehicle information image or video generated from the display unit to the combiner 200 through the mirror 500 and finally project the vehicle information, such that the head up display device may be driven even at the dashboard of the vehicle while simplifying the operation of the head up display device, thereby improving the convenience of use and the marketability.

As set forth above, according to the exemplary embodiments of the present invention, the combiner, the plurality of covers, and the mirror may be operated by the operation of the motor to simplify the operation of the head up display device and operate the head up display device even at the dashboard of the vehicle, thereby improving the convenience of use and the marketability.

As described above, although the present invention has been described with reference to exemplary embodiments and the accompanying drawings, it would be appreciated by those skilled in the art that the present invention is not limited thereto but various modifications and alterations might be made without departing from the scope defined in the following claims.

What is claimed is:

1. A head up display device for a vehicle, comprising:
a housing configured to be mounted on a dashboard of the vehicle;
a display unit configured to be mounted in the housing to generate an image or a video;
a combiner configured to be vertically elevated from the housing;
a first cover configured to rotate by being operated together with the combiner to be opened and closed;
a second cover configured to rotate by being operated together with the combiner to be opened and closed; and
a mirror configured to rotate together with the first cover so as to be opened at the time of opening the first cover to reflect the video provided from the display unit to the combiner,
wherein the housing is provided with a guide unit which is vertically provided with guide grooves, and a lower portion of the combiner is provided with guide protrusions which protrude to both ends thereof to allow the guide protrusions of the combiner to be movably inserted into the guide grooves of the guide unit.

2. The head up display device for a vehicle according to claim 1, wherein one end of the guide unit is provided with a step motor, and the step motor is operated together with a plurality of reduction gears, which are operated together with the guide protrusions of the combiner throw) a bar-shaped lead screw to vertically elevate the combiner depending on the operation of the step motor.

3. The head up display device for a vehicle according to claim 1, wherein the guide unit is provided with a first connection gear and a second connection gear, and the first connection gear is operated together with the first cover and the second connection gear is operated together with the second cover.

4. The head up display device for a vehicle according to claim 3, wherein a rotating shaft of the mirror is operated together with a rack gear, and a rotating shaft of the first cover is provided with a first cover gear to allow the rack gear and the first cover gear to be operated together.

5. The head up display device for a vehicle according to claim 4, wherein the guide unit provided with the first connection gear is provided with a bracket provided with a sliding groove, and a side of the rack gear is provided with a locking protrusion to allow the locking protrusion to move along the sliding groove.

6. The head up display device tbr a vehicle according to claim 3, wherein a rotating shaft of the second cover is provided with a second cover gear and is operated together with the second connection gear of the guide unit.

7. The head up display device for a vehicle according to claim 4, wherein a linkage is further provided between the mirror and the rack gear.

8. The head up display device for a vehicle according to claim 1, wherein a side of the housing is provided with a guide hole and an end of the guide protrusion of the combiner is inserted into the guide hole.

9. The head up display device for a vehicle according to claim 1, wherein the first cover is configured to open in a forward direction.

10. The head up display device for a vehicle according to claim 1, wherein the second cover is configured to open in a backward direction.

11. A method for operating a head up display device for a vehicle, comprising:

mounting a housing on a dashboard of the vehicle;

mounting a display unit in the housing, the display unit configured to generate an image or a video;

arranging a combiner so as to be elevated vertically from the housing;

opening a first cover by rotating the first cover together with the combiner;

opening a second cover by rotating the second cover together with the combiner; and rotating a mirror together with the first cover so as to be opened together with the first cover to reflect the video provided from the display unit to the combiner, wherein the housing is provided with a guide unit which is vertically provided with guide grooves, and a lower portion of the combiner is provided with guide protrusions which protrude to both ends thereof to allow the guide protrusions of the combiner to be movably inserted into the guide grooves of the guide unit.

12. The method according to claim 11, wherein the first cover is configured to open in a forward direction.

13. The method according to claim 11, wherein the second cover is configured to open in a backward direction.

* * * * *